United States Patent [19]

Rhodes

[11] 4,233,719
[45] Nov. 18, 1980

[54] METHOD FOR MANUFACTURING A HEAT TRANSFER ASSEMBLY

[75] Inventor: Eugene E. Rhodes, Belleville, Mich.

[73] Assignee: Ford Motor Company, Dearborn, Mich.

[21] Appl. No.: 940,932

[22] Filed: Oct. 6, 1978

[51] Int. Cl.³ .............................................. B23P 15/26
[52] U.S. Cl. ........................... 29/157.3 A; 113/118 A; 113/1 C; 113/118 V; 29/726; 228/183
[58] Field of Search .................... 29/157.3 B, 157.3 A, 29/726; 148/127; 228/173 A–173 F, 173 R, 183; 113/1 C, 118 A, 118 V, 118 R, 118 B, 118 C, 118 D

[56] References Cited
U.S. PATENT DOCUMENTS

| 2,252,211 | 8/1941 | Seemiller | 29/157.3 B |
| 2,573,161 | 10/1951 | Tadewald | 29/157.3 B |
| 2,686,957 | 8/1954 | Koerper | 29/157.3 A |
| 2,838,830 | 6/1958 | Huggins | 29/157.3 B |
| 2,847,191 | 8/1958 | Matta et al. | 29/157.3 B |
| 3,021,804 | 2/1962 | Simpelaar | 29/157.3 A |
| 3,071,187 | 1/1963 | Fairbanks | 29/157.3 B |
| 3,237,688 | 3/1966 | Huggins | 29/157.3 B |
| 3,960,308 | 6/1976 | Jonason | 228/5.1 |

Primary Examiner—Daniel C. Crane
Assistant Examiner—V. K. Rising
Attorney, Agent, or Firm—Robert E. McCollum; Clifford L. Sadler

[57] ABSTRACT

An improved method for manufacturing a heat transfer assembly particularly useful as a component of a radiator used to remove heat from the coolant of an internal combustion engine. The heat transfer assembly includes a plurality of louvered fin strips having fold edges that are in heat transfer contact, through solder joints, with flat-sided tubes designed to carry the fluid to be cooled by a flow of air contacting both the exterior surfaces of the tubes and the fin strip surfaces. The improved method involves the application of beads of solder to the fold edges of the fin strips, rather than to the tubes as in the prior art, before assembly of the fin strips and the tubes. The improved method reduces the amount of solder required and thereby reduces manufacturing cost.

2 Claims, 6 Drawing Figures

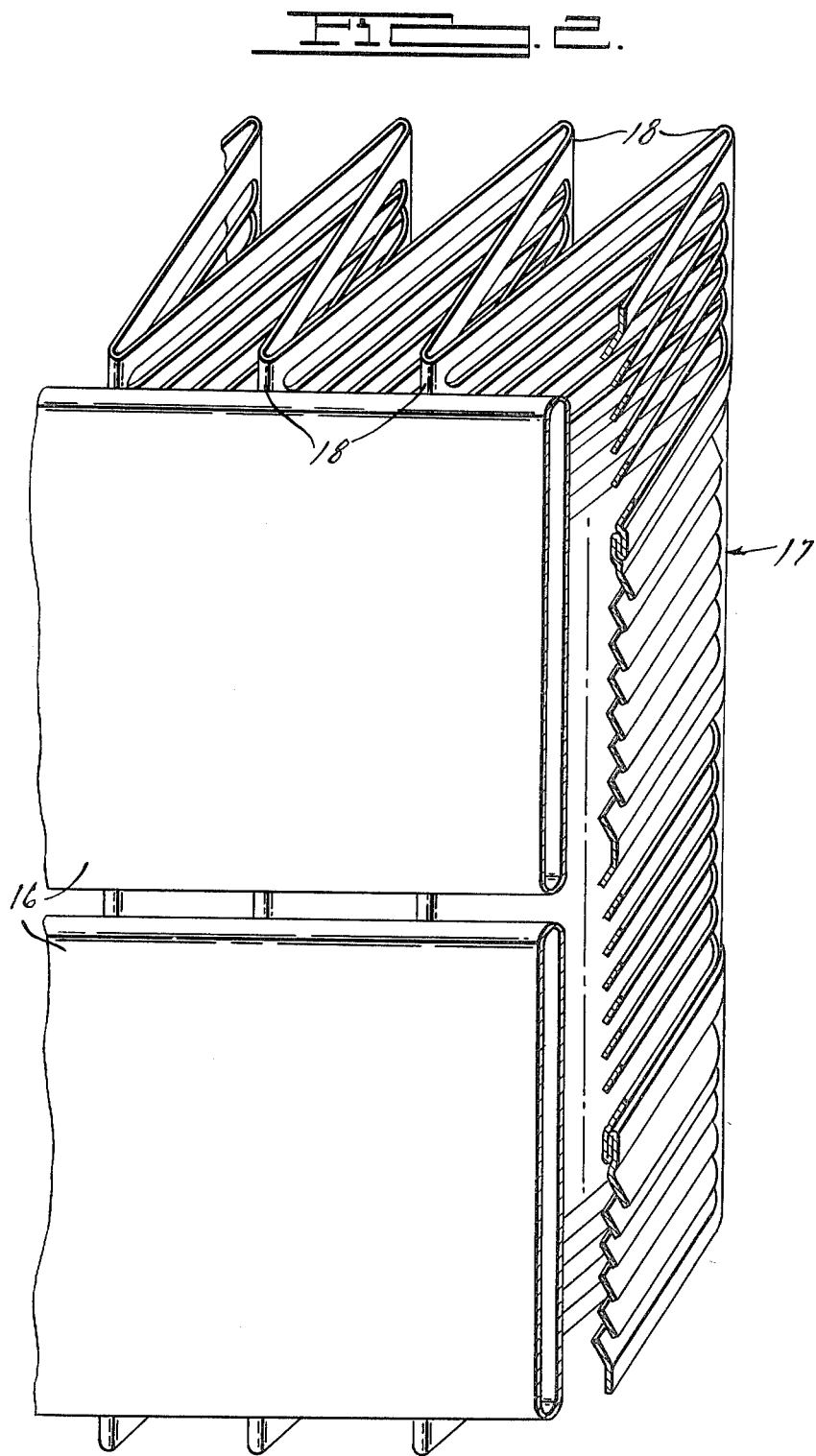

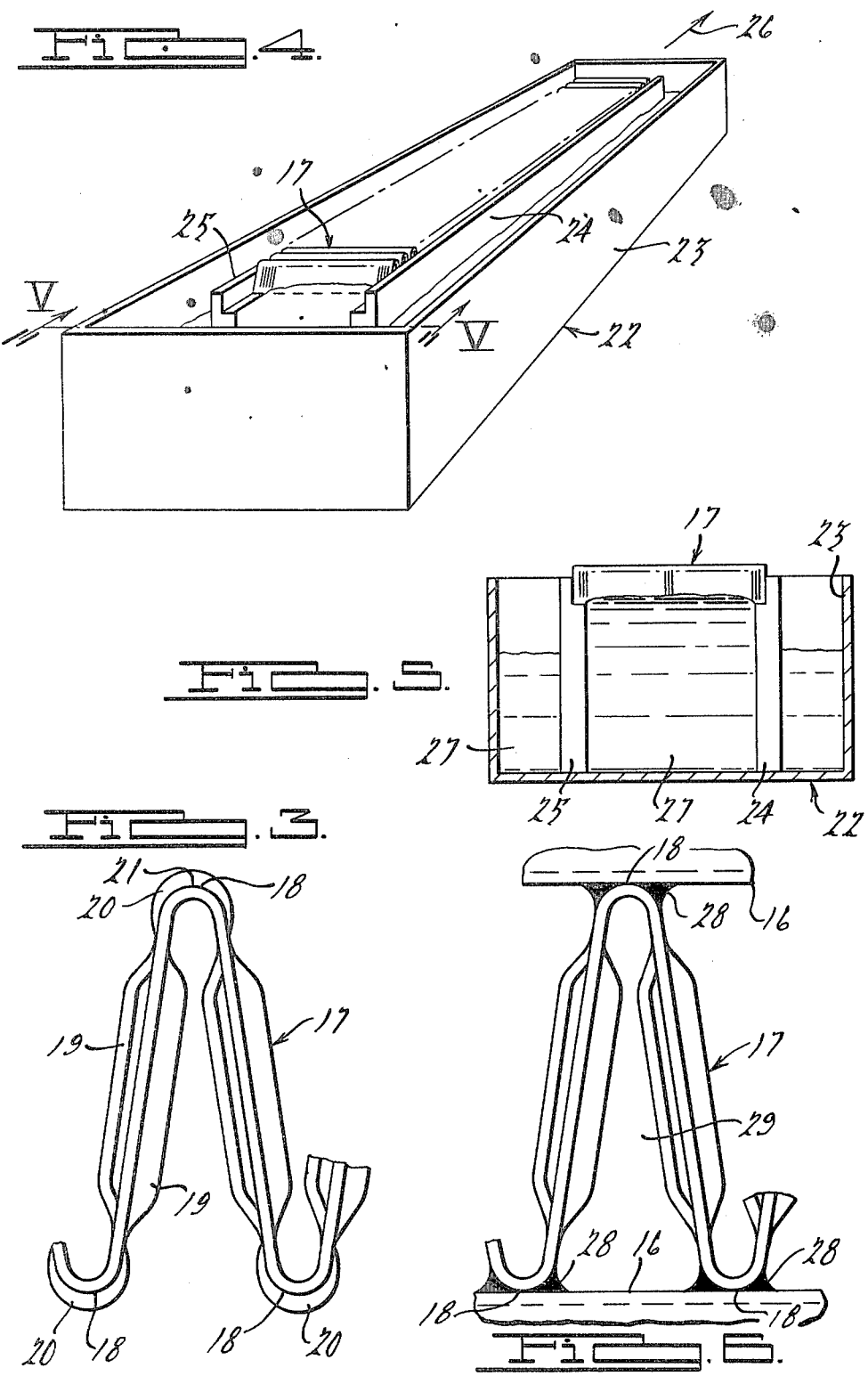

METHOD FOR MANUFACTURING A HEAT TRANSFER ASSEMBLY

CROSS REFERENCE TO RELATED PATENTS

Reference is made to commonly assigned U.S. Pat. Nos. 3,993,125; 3,481,173 and 3,318,128 issued in the name of the present inventor and to U.S. Pat. Nos. 3,433,044; 3,214,954 and 3,250,325 issued in the name of the present inventor and A. M. Kurz. These patents relate to heat exchanger or heat transfer devices similar to those which may be manufactured with the use of the method of the present invention and also methods utilized in the manufacture of such devices. Particular reference is made to the aforementioned U.S. Pat. Nos. 3,993,125 which describes a preferred fin strip design and heat exchange device for use in the practice of the method of the present invention.

BACKGROUND OF THE INVENTION

This invention relates to a method for manufacturing a heat transfer assembly. While the invention is particularly applicable to heat transfer devices of the type used in radiators for removing heat from the coolant in the cooling system of internal combustion engines, the invention in general is applicable to heat exchange devices where heat is transferred between liquid flowing through tubes and gases flowing through passages defined both by such tubes and by heat exchange fin strips associated therewith.

In the prior art method for manufacturing heat transfer devices of the type described above, a plurality of fin strips (typically made of copper) are formed, each of the fin strips being made from a unitary strip of metal folded back and forth to form a plurality of fin elements each having an essentially planar member between the fold edges. A plurality of substantially flat-sided metal tubes (typically made of brass) also are formed and, in past practice, these tubes have had a seam formed by interlocking crimped edges extending the length of the tube. Solder is used to seal the flat-sided tube. The fin strips and tubes are treated with a flux to remove surface oxidation and contaminants on the surface prior to the assembly of the fin strips and tube.

The fin strips and tubes are formed into a heat transfer assembly by placing a plurality of the tubes along side one another, by placing the fold edges on one side of a fin strip along the length of such tubes, and then by placing a second plurality of tubes on the fold edges on the opposite side of the fin strip, thereby, forming a sandwich construction. As many layers of tubes and fin strips as may be required may be stacked in this manner.

When the heat transfer assembly is to be used as a radiator for a motor vehicle, tanks are placed at opposite ends of the heat transfer assembly and are secured thereto so that coolant from the motor vehicle engine may enter one of the tanks, pass through the tubes and be cooled, and then enter the opposite tank from which it is withdrawn and then recirculated to the engine.

In manufacture of the heat transfer assembly, it is necessary to secure the fold edges of the fin strips to the flat sides of the tubes by soldering these together at such locations. The solder joint provides heat transfer from the tubes to the fin strips through thermal conductivity at such bond locations and the bonds also provide mechanical attachment of the fin strips to the tubes.

Prior art manufacturing processes have applied coats of solder to the entire exterior surface (and to crimped seams) of the tubes prior to their use in the heat transfer assembly. Once the assembly is made, the entire assembly, including tanks when the heat transfer assembly is used in a motor vehicle radiator, is placed in an oven where the solder on the tubes is caused to melt and thereby to flow to the locations of contact between the fold edges of the fin strips and the flat sides of the tubes. This produces the solder joints described above. Unfortunately, the solder that is on the tubes, but which does not constitute a part of the joint between the tubes and the fold edges of the fin strips is wasted, and also adds undesirable weight and manufacturing cost to the heat transfer assembly.

SUMMARY OF THE INVENTION

The present invention provides an improved method for manufacturing a heat transfer assembly and, more particularly, provides an improved method for forming solder joints between the fin strips and the tubes of a heat exchange device of the type described above. According to the improved method, prior to the assembly of the fin strips and tubes, solder is applied to the fold edges of the fin strips. The fin strips and tubes subsequently assembled are placed in an oven or are otherwise heated to cause the solder to flow from the fold edges to the tubes contacting such fold edges thereby to form a solder joint between the fold edges and the tubes. This improved method for forming such solder joints has been found to reduce substantially the weight of the heat transfer assembly and to reduce the manufacturing costs thereof. In heat transfer assemblies used in motor vehicle applications, a reduction of about one quarter kilogram of solder weight may be achieved with use of the new method of manufacture described herein as compared to past industry practice.

The invention may be better understood by reference to the detailed description which follows and to the drawings.

CITATION OF PRIOR ART REFERENCES

The following U.S. Patents are cited as prior art references with respect to the subject matter of this patent application: Earies No. 855,239; Massey No. 1,512,295; Mougey No. 1,651,403; Whitney No. 1,685,657; Welch No. 2,240,473; Gay No. 2,327,259; Brown, Jr. No. 2,572,593; Simpelaar No. 2,693,026; Brown, Jr. No. 2,703,921; and Welsh No. 2,930,405. The Earies patent at page 2, column 1, discloses a method for bonding flanged fins to a shell for an engine by applying spelter to the fin flanges prior to heating to cause a bond to result between the flange and the shell. The Massey patent discloses application of a coating of tin flux to sheet metal fins before they are fused or welded to cast metal. The Whitney and Welch patents relate to the use of strips of material placed between the tubes and fins of heat exchangers. The remaining patents listed above relate primarily to the use of various coatings on the fins of heat exchangers prior to bonding these fins to other components.

BRIEF DESCRIPTION OF THE DRAWINGS

FIG. 2 is an enlarged perspective view illustrating a portion of a fin strip and portions of two flat-sided tubes attached thereto in the manner such components are utilized in the crossflow radiator of FIG. 1;

FIG. 3 is an enlarged plan view of a portion of the edge of a fin strip as shown in FIG. 2 and illustrates the fin strip after application to its fold edges of solder and prior to the melting of such solder to form the solder joints mentioned above;

FIG. 4 illustrates a wave-soldering apparatus that may be used in applying the solder to the fin strip as shown in FIG. 3;

FIG. 5 is a sectional view taken along the line V—V in FIG. 4 and illustrates in greater detail the wave-soldering apparatus of FIG. 4; and FIG. 6 is an enlarged view illustrating the solder joints formed between the fin strips and tubes of a heat transfer assembly.

DETAILED DESCRIPTION OF THE INVENTION

Figure 1:
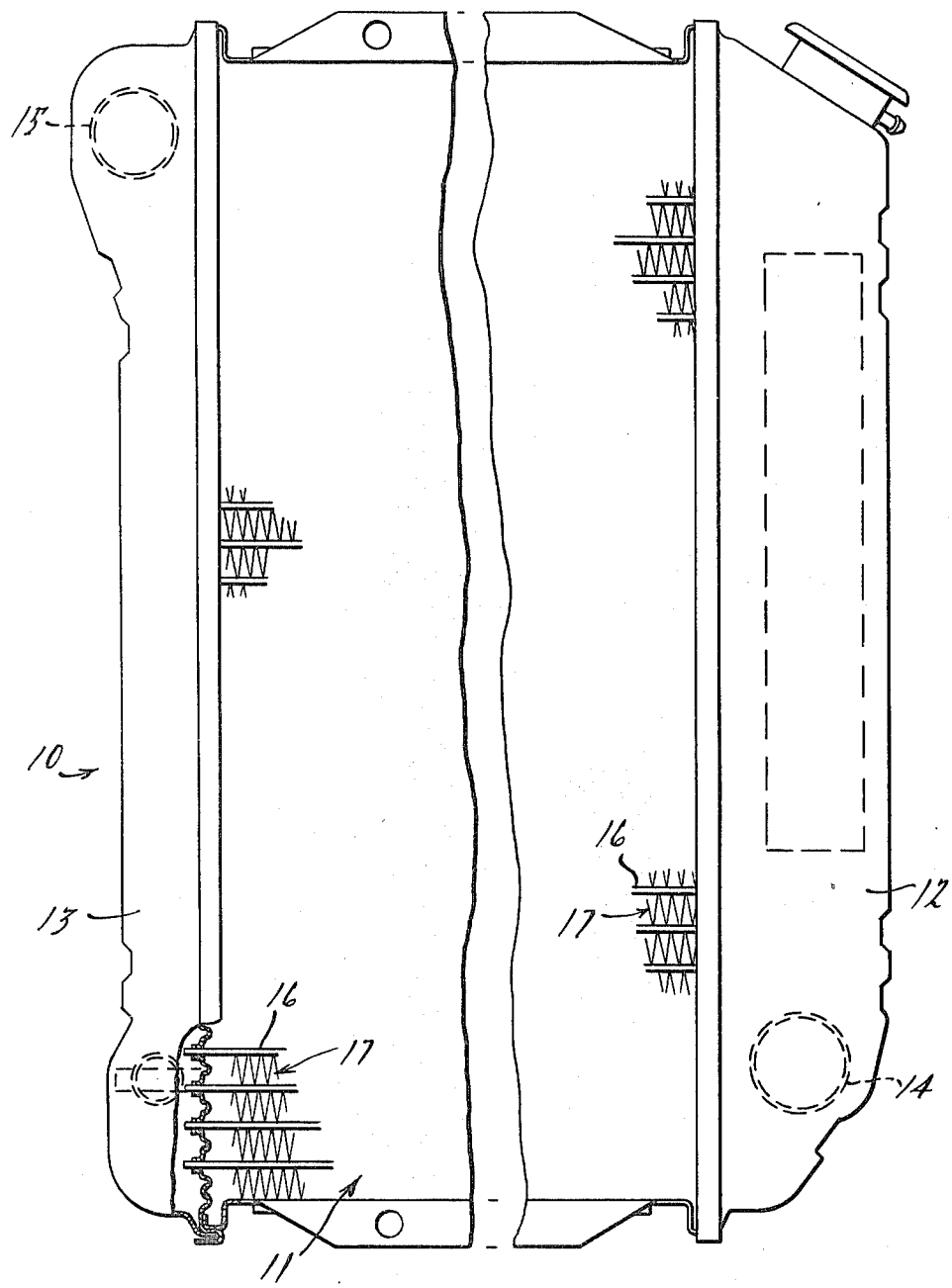
FIG. 1 is an elevational view of a cross-flow heat transfer assembly in the form of a radiator for a motor vehicle.

With reference to now to the drawings, wherein like numerals refer to like parts or components in the several views, there is shown in FIG. 1 a heat transfer device or radiator suitable for use in a motor vehicle. The radiator, generally designated by the numeral 10, includes a heat transfer assembly or core 11 having at opposite ends an inlet tank 12 and an outlet tank 13. The inlet and outlet tanks include conduits 14 and 15, respectively, adapted for connection to the engine of a motor vehicle.

Coolant from the engine enters the inlet tank 12 through the conduit 14 and then is caused to flow through a plurality of parallel tubes 16 to the outlet tank 13. The coolant in outlet tank 13 flows from the discharge conduit 15 to the engine. The tubes 16 are substantially flat-sided tubes separated by fin strips 17.

As is shown in more detail in FIG. 2, the fin strips 17 are unitary strips of metal, usually copper, that are folded back and forth at equally-spaced locations to produce fold edges 18 on opposite sides of the fin strips. The fin strip may be of the preferred design shown in FIG. 2 and may be fabricated by methods described in the commonly assigned patents previously mentioned.

In the manufacture of the heat transfer assembly 10, it is necessary to produce solder joints between the fold edges 18 and the tube surfaces in contact with such fold edges to bond the fin strips thereto and to permit thermal conduction between the tubes and fin strips. This, of course, enhances the transfer of heat between the tubes and the air or other gaseous medium caused to flow through the passages defined by the triangular spaces 29 (FIG. 6) formed between the fin strips and tubes after their assembly and during the use of the heat transfer device.

Prior art practice has dictated the application of a uniform coating of lead-tin solder to the tubes 16 after cleaning thereof with a flux. The fin strips also are cleaned with a flux for the purpose of removing metal oxides and other surface contamination from the metal. In prior art heat transfer assemblies, the tubes 16 generally have had crimped seams running along their length which required soldering as well as did the joints between the fin strip fold edges and the tube surfaces. FIG. 2 illustrates the preferred form the tubes 16 for use of the method of the present invention. The tubes are seamless or if seams are used, the seam is welded or otherwise sealed prior to assembly in the heat transfer device.

According to the present invention, the solder is applied to the fold edges 18 rather than to the exterior surface of the tubes 16 as has been past practice. The solder may be applied to all or substantially all of the fold edge or, alternatively, may be applied to only those sections of each fold edge where a solder bond to a tube is made.

With reference now to FIG. 3, there is shown an edge view of a portion of the fin strip 17. It may be seen that the fin strip has louvers 19. Also, it may be seen that the fold edges 18 of the fin strips have a bead of solder 20, preferably a conventional composition lead-tin solder, that has been applied to each fold edge over a majority of its length. A preferred solder has a composition of 30 percent tin and 70 percent lead and is in accordance with SAE standard J473 alloy 3A except that the antimony composition is limited to 1.4 percent maximum. The solder preferably extends down through the point at which the louvers 19 begin and may have a thickness of from about 0.038 to 0.064 millimeters at the tip 21 of the fold edges.

In FIG. 4 there is shown a wave-soldering apparatus through which the fin strips may be made to pass for the purpose of applying solder to the fold edges 18 of the fin strips. The wave soldering apparatus 22 includes a tank or vessel 23 containing liquid solder. Channel members 24 and 25 located in the vessel 23 guide the fin strip 17 as it proceeds through the wave-soldering apparatus 22 while moving in the direction of the arrow 26. The fin strips 17 may be made to pass through the wave soldering apparatus prior to being cut into appropriate lengths. The liquid solder 27 in the vessel 23 is depressed in depth at the outer sides of the vessel and is elevated in the center portion between the channel members 24 and 25. Thus, there is a standing wave of solder. This may be produced by a pump or other suitable device applying pressure to the solder in the vessel. As the fin strip 17 passes along the wave-soldering apparatus, solder is applied to the lowermost fold edges 18 of the fin strips 17. After passing through the wave-soldering apparatus 22, the fin strip 17 is reversed so that its upper side in FIGS. 4 and 5 becomes its underneath side and then the fin strip 17 is again passed through a wave-soldering apparatus so that solder may be applied to the fold edges 18 on the upper side of the fin strip 17 as this fin strip is viewed in FIGS. 4 and 5. Of course, turning over the fin strips in this manner is necessary so that solder is applied to both sides of the fin strip to achieve the solder application illustrated in FIG. 3.

Subsequent to the solder application, the fin strips 17 and the tubes 16 are assembled in sandwich fashion as is customary in the manufacture of heat transfer assemblies of the type described herein.

If the heat transfer assembly is to form the core of a motor vehicle radiator, then after assembly of the tubes and fin strips, the inlet and outlet tanks 12 and 13 are assembled to the heat transfer assembly core portion and the entire unit then is subjected to sufficient heat and temperature so that the solder beads 20 flow to form the solder joints 28 illustrated in FIG. 6.

It will be appreciated that the solder joints 28 are made at the locations where contact is made between the fold edges 18 of the fin strips 17 with the flat surfaces of the tubes 16. The solder, when applied as beads 20 to the fold edges of the fin strips 17 need not cover the entire length of the fold edge because the solder joint is required only at the locations of contact between the fold edges 18 and the surfaces of the tubes 16.

Based upon the foregoing description of the invention, what is claimed is:

1. In the method for manufacturing a heat transfer assembly comprising the steps of:
   (a) forming a plurality of fin strips, each of said fin strips being made from a unitary strip of metal folded back and forth to form a plurality of fin elements each having an essentially planar member between the fold edges;
   (b) forming a plurality of substantially flat-sided metal tubes, said tubes being seamless or having seams that are welded or otherwise sealed;
   (c) cleaning said fin strips and said tubes with flux to remove surface oxidation and contaminants therefrom;
   (d) forming a heat transfer assembly by the assembly of a plurality of said fin strip and tubes, at least one flat side of each of said tubes being in conductive heat transfer contact with a plurality of the fold edges of at least one of said fin strips through solder joints made at the locations of said conductive heat transfer contact, said solder joints being made by the application of solder to selected components in said heat transfer assembly and by the application thereafter to said heat transfer assembly of heat and temperature sufficient to cause said solder to flow, thereby, to join said selected components to other components in said heat transfer assembly;
   wherein the improvement comprises:
   (e) prior to the assembly of said fin strips and tubes, applying solder as a bead extending along a majority of the length of said fold edges of said fin strips, the solder bead on the fold edges being applied to said fold edges by causing said fin strips to pass through liquid solder which thereafter solidifies on said fold edges as beads, the liquid solder being in a vessel, the surface of the liquid solder having a standing wave generated therein whereby a solder peak is formed, the metal from which said fin strips are formed, after being folded back and forth to form said fold edges, having said fold edges pass through the solder peak in said vessel; and
   (f) said heat and temperature thereafter applied to said heat transfer assembly causing solder to flow from said fold edges to said tubes, thereby, to form said solder joints made at locations of said conductive heat transfer contact.

2. The improved method of claim 1, wherein the fold edges on one side of each of said fin strips are made to pass through the solder peak, said fin strips thereafter being turned over on their opposite sides and their fold edges on said opposite sides then being made to pass through the solder peak.

* * * * *